Patented May 6, 1941

2,240,622

UNITED STATES PATENT OFFICE 2,240,622

PROCESS OF FILTRATION UTILIZING POROUS CEMENTS

Walter Eastby Lawson, Woodbury, N. J., assignor to E. I. du Pont de Nemours & Company, Wilmington, Del., a corporation of Delaware No Drawing. Application January 25, 1939, Serial No. 252,773

2 Claims. (Cl. 166—21)

The present invention relates to means for purifying oil, and in particular to an improved oil well filter. An important problem in the production of crude oil is that of obtaining the oil from the well substantially free from certain solid materials such as sand and the like. This problem becomes particularly acute in certain oil fields in eastern Texas and California, where the wells are so troubled by sanding that they cannot be conveniently shot with explosives because of the extensive clean-outs which would be required. The many oil well filters known heretofore have displayed numerous disadvantages which render them unsuitable for such conditions.

The object of the present invention is a new, improved filtering means especially adapted to use in oil wells. Another object is a method for producing from a sandy well, oil substantially free from included solid material such as sand and the like. Another object is a new and improved filter element especially adapted to the filtration of petroleum. Other objects will be apparent from the following detailed description of my invention.

The foregoing objects are accomplished and disadvantages overcome according to this invention by passing the oil polluted with included solid material through a filter body comprising porous cement. While it is possible to employ preformed filter elements, the filter body is preferably cast from an appropriate cement slurry in the position in which it is to be used, i. e., at some point between the well cavity and the pump location. The required porosity may be attained in any suitable manner, one such method which gives markedly superior results being to include in the cement slurry a suitable "diluent," all or part of which is subsequently removed to produce cavities, and a polar compound containing at least eight carbon atoms which is capable of stabilizing the foam in the presence of the cations common to said cement.

In the preferred practice of the invention, the porous filter element is disposed in the well in such a position that oil passing from the oil-bearing strata will be caused to pass through the same, and, accordingly will be freed from included solids such as sand and the like. The filter element cement is preferably run or pumped into the well while still liquid and permitted to set up at a predetermined location and in a predetermined shape and thickness. Thus, the filter element may be cast into place within the walls of the well as a lining of an opening drilled through an oil-producing stratum in the earth, or as a lining in the pumping cavity at the bottom of the drill hole below the casing. Various mechanical devices such as plugs or forms may be employed to confine the liquid cement to produce a definite pumping cavity. Alternatively, the lower part of the drill hole may be filled with filter cement to a certain level and a suitable pumping cavity drilled into the filter cement after it has set. The latter alternative method is especially adapted for use after shooting of the well with explosives, the cement being introduced at any suitable time thereafter, for example, after a preliminary clean out.

The following examples will serve to illustrate filter element compositions suitable for use according to my invention. It should be understood, however, that this is entirely for the purpose of illustration and is not to be construed as having a limiting effect upon the scope of the invention. Parts given are by weight. In these examples the permeability of the filter element is expressed in terms of that unit of permeability known as the darcy. This permeability may be calculated by means of the following formula developed by Wyckoff and others.

$$k \text{ (in units darcy)} = \frac{\mu Q L}{A T (P_1 - P_2)}$$

where $\mu$ = viscosity of fluid in centipoises
$L$ = length of test specimen in cm.
$Q$ = cc. of fluid passed in time $t$
$t$ = time of flow expressed in seconds
$A$ = area of cross-section of test specimen in square cm.
$(P_1 - P_2)$ = pressure drop in atmospheres through the specimen Using this equation it is possible to calculate the permeability of the filter media beforehand from laboratory data.

Example 1

100 parts of Portland cement, 300 parts sand and 2.5 parts cetyl betaine were mixed with sufficient water to give a thick slurry; 3.75 parts of 30% hydrogen peroxide was then combined with this admixture, and the resulting concrete was poured into cylindrical molds 1½" in diameter. After aging for one week, this concrete was examined for permeability by oil, using crude petroleum which had a Saybolt Furol viscosity of 157.7 seconds at 24° C. With a pressure gradient of 13 lbs./sq. inch through a cylinder one inch long, a total of 313 g. of crude oil was filtered in 15 minutes. This concrete had a permeability of 203 darcies, while concrete similarly prepared, except for omission of the cetyl betaine, had a permeability of about 0.4 darcy.

Example 2

A sample of concrete was prepared from 100 parts Portland cement, 300 parts sand, 46 parts water, 4.2 parts $CaCl_2$ which had been dissolved in a portion of the water and 2.5 parts of a sodium petroleum sulfonate soluble in the presence of calcium ions. The slurry was rendered porous by vigorous agitation, the process being continued until the volume of the slurry had been increased 40% due to the incorporation of foam. This concrete was cast into test specimens and aged for one week. In determining oil permeability of the sample, a crude oil having a Saybolt Universal viscosity of 85.9 seconds at 24° C. was used, and the filter medium was found to have a permeability of 280 darcies.

Example 3

A sample of concrete with twice the normal water content was prepared from 1 part Portland cement, 3 parts sand and 1.25 parts of aqueous 5% cooked starch. Concrete prepared in this manner is suitable as a filtering medium, being more than 120 times as permeable by air as was concrete of normal water content.

Example 4

A sample of concrete prepared from 1000 parts Portland cement, 3000 parts sand, 480 parts water, 3.75 parts sodium octyl sulfate and 37.5 parts 30% hydrogen peroxide was found to have a specific permeability to crude oil of 350 darcies.

Example 5

Concrete prepared from 300 parts sand, 100 parts Portland cement, 50 parts water, 2.5 parts cetyl pyridinium bromide and 3.75 parts of 30% hydrogen peroxide was found to be suitable as a filter medium for oils, having a permeability of 1000 darcies.

Other types of cement are also suitable for use as filter elements, provided the cement is rendered porous by appropriate treatment. This is illustrated in the following example.

Example 6

An aqueous slurry of plaster was prepared from 5 parts gypsum plaster, 1 part water, 2 parts aqueous 2.5% $K_2SO_4$ solution and 0.1 part ammonium oleate. Thoroughly combined with this slurry was 0.2 part of 30% hydrogen peroxide, and the product was poured into molds to set. A cylinder of this plaster, ¾" in diameter by 1" in length, was examined for gas permeability. When the drop in pressure through this cylinder was 2½ lbs./sq. inch, the flow of air was found to be 1700 cc. per minute. A similar sample of plaster from which the ammonium oleate had been omitted transmitted less than 1 cc. of air per minute.

Satisfactory filtrations also can be effected with porous concretes in the preparation of which the specific long-chain polar compounds of the examples are replaced by any other polar organic compound containing at least eight carbon atoms which is capable of stabilizing cement foam in the presence of cations common to the cement. Thus, long-chain alcohol acid sulfates, alkyl-substituted aromatic sulfonic acids, and petroleum sulfonic acids or salts of these acids are in general use. The following polar compounds in particular were tested and found to be effective as foam stabilizers in manufacturing the porous cement.

Glyceryl monoricinoleate
Sodium isopropyl naphthalene sulfonate
Sodium N-benzyl anthranilate
Gelatine
Gliadin
Sodium octyl sulfate
Sodium iso-octane sulfonate
Sodium dodecyl sulfate
Dodecyl amine
Octadecyl betaine
Sodium salt of sulfated ethyl oleate
Sodium salt of oleic acid amide of N-methyl taurine
Stearyl trimethyl ammonium bromide
Sodium decyl sulfate
Ammonium oleate Although, in the examples which have been included here, either concrete in which the cement-sand ratio is 1:3 or gypsum plaster have been used for the preparation of filter media, favorable results can be obtained if the filter bed is prepared from other types of inorganic cement. In general, these cements will always be hardened at temperatures below 100° C. Among the suitable substitutes are Portland cement concrete of ratios other than 1:3; magnesium oxychloride cement; plaster of Paris; sodium silicates of various silica/$Na_2O$ ratios, either alone or with inert filler such as clay, and hardened by the action of included or externally added acids; anhydrite plaster; slaked lime mortar; aluminous cements; and puozolanic cement concretes. In addition to inorganic cements such materials as viscose, rubber or synthetic rubber latex, nitrocellulose, and urea-formaldehyde resins yield structures suitable as filters, provided these materials before hardening are rendered porous by suitable treatment. Aqueous emulsions of suitable binders in solvated form and containing a thickening agent and a solid or gaseous diluent, are, in general, adapted for the purpose.

These porous cements should have a permeability of at least one darcy and preferably at least 5 darcies. The permeability of ordinary concrete ranges from 0.0001 to 0.01 darcy, depending upon the ratio of sand to Portland cement, degree of packing, and its water content. There is no upper limit of permeability which may be specified for these structures, except porosity must not be extended beyond that point at which the cement will not support itself. For the filtration of crude oil, it is considered that structures which are ideal from the standpoint of both strength and porosity are secured if the permeability is at least 25 and not more than 5,000 darcies, though, in many instances, the permeability may be with advantage 10,000 darcies or higher.

The degree of porosity desired of the filter medium will usually determine the proportion of inorganic cement to polar organic compound and pore-forming diluent, but, ordinarily, porous products which may be satisfactorily wetted and permeated by oil can be prepared if the concentration of polar organic compound lies between 0.001 and 15% by weight of the aqueous slurry, and the volume of the cement slurry is increased by from 1 to 500% through the inclusion of a diluent. In those applications where high permeability is desirable but an excessively weak filter medium is to be avoided, e. g., in the filtration of crude oil, the preferred concentration of polar organic compound lies between 0.005 and 3% by weight of the aqueous slurry and the dilution of the slurry should lie between the limits of 5% and 300% by volume.

Various means of diluting the cement slurry may be employed to give a porous product suitable as a filter medium. A gas developing material may be included in the slurry; in addition to hydrogen peroxide, such materials as calcium carbide, finely divided active metals such as aluminum, magnesium or zinc, a carbonate in the presence of acid, or urea in the presence of nitrous acid, yield products of satisfactory porosity. If desired, a preformed foam may serve as the diluting material. It is also possible to dilute the cement slurry with water-insoluble materials such as paraffin balls or a mineral oil; subsequent removal of such materials by leaching produces cavities in the cement which increase its porosity. Also, products of suitable porosity can be prepared by including a porous aggregate such as coke in the cement as a diluent. However, the invention in its most preferred form contemplates such diluents only when they are employed in conjunction with the polar organic compounds noted.

The outstanding advantage of the invention is its applicability to the production of crude petroleum in the course of removing the oil from the well. The materials herein specified lend themselves well to being poured into place through the restricted mouth of the well, yet to fall in such a position as to actually define the pumping cavity at the bottom of the well. The same pumping action which removes the oil from the well draws the oil through the filter element, freeing the liquid from included solid matter, especially that produced by shooting the well. The invention has the added advantage of providing a means for supporting the walls of the well cavity, thereby preventing sudden or gradual filling in and clogging of said cavity, without blocking the inflow of oil.

It will be appreciated that various modifications may be employed without departing from the scope of the invention. Nor are the uses to be limited by the particular conditions set forth. Therefore, I intend to be limited only by the following patent claims.

I claim:

1. Process which comprises incorporating a foam into a plastic hydraulic cement, said cement containing (1) a pore-producing diluent in amount sufficient to give a dilution from about 5% to about 300% by volume and (2) a foam-stabilizing polar organic compound from the group consisting of long chain alcohol acid sulfates containing not less than 8 carbon atoms and alkali metal salts thereof, in amount between about 0.005% and about 3.0% by weight of the mixture, introducing the mixture in fluid condition into an oil well between the pump location and the walls of the well cavity, allowing the cement to set in such manner as to conform to the contours of the confining surfaces and to substantially close all channels between pump and oil source, and causing the oil to pass through the resulting structure, said structure having a permeability of from about 25 to about 5000 darcies.

2. A process according to claim 1 wherein the foam stabilizer is sodium dodecyl sulfate.

WALTER EASTBY LAWSON.

CERTIFICATE OF CORRECTION.

Patent No. 2,240,622.             May 6, 1941.

WALTER EASTBY LAWSON.

It is hereby certified that error appears in the printed specification of the above numbered patent requiring correction as follows: Page 1, second column, line 27, in the formula, for "$AT(P_1-P_2)$" read --$At(P_1-P_2)$--; and that the said Letters Patent should be read with this correction therein that the same may conform to the record of the case in the Patent Office.

Signed and sealed this 10th day of June, A. D. 1941.

(Seal)

Henry Van Arsdale,
Acting Commissioner of Patents.